US012413030B2

(12) United States Patent
Matsumoto et al.

(10) Patent No.: US 12,413,030 B2
(45) Date of Patent: Sep. 9, 2025

(54) CONNECTOR STRUCTURE

(71) Applicant: J.S.T. MFG. CO., LTD., Tokyo (JP)

(72) Inventors: Hiroyuki Matsumoto, Yokohama (JP); Nozomi Kawai, Miyoshi (JP)

(73) Assignee: J.S.T. MFG. CO., LTD., Tokyo (JP)

(*) Notice: Subject to any disclaimer, the term of this patent is extended or adjusted under 35 U.S.C. 154(b) by 340 days.

(21) Appl. No.: 18/026,768

(22) PCT Filed: Sep. 13, 2021

(86) PCT No.: PCT/JP2021/033533
§ 371 (c)(1),
(2) Date: Mar. 16, 2023

(87) PCT Pub. No.: WO2022/070861
PCT Pub. Date: Apr. 7, 2022

(65) Prior Publication Data

US 2023/0344181 A1 Oct. 26, 2023

(30) Foreign Application Priority Data

Sep. 29, 2020 (JP) ................................ 2020-163956

(51) Int. Cl.
*H01R 24/54* (2011.01)
*H01R 13/506* (2006.01)

(52) U.S. Cl.
CPC ......... *H01R 24/542* (2013.01); *H01R 13/506* (2013.01)

(58) Field of Classification Search
CPC .... H01R 24/542; H01R 13/50; H01R 13/501; H01R 13/631; H01R 2103/00
See application file for complete search history.

(56) References Cited

U.S. PATENT DOCUMENTS 5,924,895 A * 7/1999 Moji ...................... H01R 24/58 439/668
7,462,068 B2 * 12/2008 Amidon ............... H01R 13/633 439/578

(Continued)

FOREIGN PATENT DOCUMENTS

EP 0616393 A2 9/1994
JP 543-006343 Y 3/1968

(Continued)

OTHER PUBLICATIONS

International Preliminary Report on Patentability (Chapter I) for International Application No. PCT/JP2021/033533 dated Apr. 13, 2023 with a copy of Notification from the International Bureau (PCT/IB/326).

(Continued)

*Primary Examiner* — Briggitte R. Hammond
(74) *Attorney, Agent, or Firm* — Kratz, Quintos & Hanson, LLP

(57) ABSTRACT

A connector structure (CS) includes an adapter (1) to be fitted to an opposing connector (100) that includes opposing terminals (102, 103) in parallel with each other and a connector (2) to be fitted to the adapter (1) in a fitting direction (X1). The connector includes a connector housing (3), a center terminal (4), and an outer terminal (5). The center terminal (4) includes a center terminal portion (40) with a central axis (C1) extending in the fitting direction. The outer terminal (5) includes a cylindrical outer terminal portion (50) that concentrically encloses the center terminal portion (40). The adapter (1) includes an adapter housing (7), a first intermediate contact (8), and a second intermediate contact (9). The adapter housing (7) and the connector housing (3) are rotatable relative to each other about the central axis (C1). The first intermediate contact (8) includes a first contact piece portion (81) to come into contact with (Continued)

an outer peripheral surface (40*b*) of a protruding portion (40*a*) of the center terminal portion (40) and a second contact piece portion to come into contact with one of the opposing terminals. The second intermediate contact (9) includes a third contact piece portion (91) to come into contact with an outer peripheral surface (50*a*) of the outer terminal portion (50) and a fourth contact piece portion (92) to come into contact with one of the opposing terminals.

8 Claims, 17 Drawing Sheets

(56) References Cited

U.S. PATENT DOCUMENTS

| | | | |
|---|---|---|---|
| 2008/0293275 | A1 | 11/2008 | Osada |
| 2009/0191765 | A1 | 7/2009 | Yamada |

FOREIGN PATENT DOCUMENTS

| | | | |
|---|---|---|---|
| JP | S43-006343 | Y | 3/1968 |
| JP | S48-015346 | Y | 4/1973 |
| JP | 663-038286 | U | 3/1988 |
| JP | S63-038286 | U | 3/1988 |
| JP | 2008-288122 | A | 11/2008 |
| JP | 2009-176580 | A | 8/2009 |
| JP | 2015-035366 | A | 2/2015 |

OTHER PUBLICATIONS

English translation of the International Preliminary Report on Patentability (Chapter I) for International Application No. PCT/JP2021/033533 dated Apr. 13, 2023 with Notification from the International Bureau (PCT/IB/338).
Extended European Search Report for corresponding European Patent Application No. 21875163.4 dated Sep. 2, 2024 (10 sheets).
Anonymous Lqwell; "XLR adapter, 2 stuks XLR 3pin aansluiting naar RCA aansluiting audio microfoon microfoon aansluiting adapter, XLR naar RCA converter adapter: Amazon.nl: Elektronica"; Jan. 15, 2020 (Jan. 15, 2020); XP093194174; Retrieved from the Internet: URL: https://www.amazon.nl/adapter-stuks-aansluiting-microfoon-converter/dp/B07T4Z9WNN/ref+sr_1_50 ?_ mk_nl_NL-AMAZON &crid=2TYQ7RALF303X&dib=eyJ2ljoiMJ9 (3 sheets).
International Search Report for International Application No. PCT/JP2021/033533 dated Oct. 19, 2021 (3 sheets, 2 sheets translation, 5 sheets total).
Written Opinion of the International Searching Authority for International Application No. PCT/JP2021/033533 dated Oct. 19, 2021 (5 sheets, 3 sheets translation, 8 sheets total).
Office Action of corresponding Japanese Patent Application No. 2022-553771: Notice of Reasons for Refusal dated Jul. 31, 2025 (3 sheets, 5 sheets machine translation, 8 sheets total).

* cited by examiner

CONNECTOR STRUCTURE

TECHNICAL FIELD

The present invention relates to a connector structure.

BACKGROUND ART

A connector disclosed in Patent Literature 1 includes a socket element and a plug element arranged to be connected to each other. The socket element has a pair of pins located side-by-side in parallel with each other, and the pair of pins are each connected to a corresponding wire. Meanwhile, the plug element has a pair of female terminals located side-by-side in parallel with each other, and the pair of female terminals are arranged to be connected, respectively, to the pair of pins.

CITATION LIST

Patent Literature

Patent Literature 1: Japanese Unexamined Patent Publication No. 2008-288122

SUMMARY OF INVENTION

Technical Problem

However, when fitting between the socket element and the plug element, it is necessary to adjust the orientation of the plug element with respect to the socket element so that the pair of pins and the pair of female terminals are aligned with each other. This may result in poor fitting workability.

A preferred embodiment of the present invention provides a connector structure for improved fitting workability with no need to adjust the orientation with respect to an opposing connector.

Solution to Problem

A preferred embodiment of the present invention provides a connector structure including an adapter to be fitted to an opposing connector that includes an opposing housing and a plurality of opposing terminals supported on the opposing housing and extending in parallel with each other, and a connector arranged to be fitted to the adapter in a fitting direction. The connector includes a connector housing, a center terminal supported on the connector housing and including a pin-shaped center terminal portion with a central axis extending in the fitting direction, and an outer terminal supported on the connector housing and including a cylindrical outer terminal portion that concentrically encloses the center terminal portion with an interposed insulating portion, the center terminal portion includes a protruding portion that protrudes from the outer terminal portion in the fitting direction. The adapter includes an adapter housing to be fitted to the connector housing in the fitting direction and displaceable rotationally relative to the connector housing about the central axis and a first intermediate contact and a second intermediate contact supported on the adapter housing. The first intermediate contact includes a first contact piece portion to elastically contact the outer peripheral surface of the protruding portion of the center terminal portion and a second contact piece portion to elastically contact a corresponding one of the opposing terminals. The second intermediate contact includes a third contact piece portion to elastically contact the outer peripheral surface of the outer terminal portion and a fourth contact piece portion to elastically contact a corresponding one of the opposing terminals.

In accordance with the arrangement above, the adapter is connected to the opposing connector in advance. That is, the second contact piece portion of the first intermediate contact and the fourth contact piece portion of the second intermediate contact of the adapter are connected, respectively, with corresponding ones of the opposing terminals. When fitting the connector into the adapter in the fitting direction, the first contact piece portion of the first intermediate contact elastically contacts the outer peripheral surface of the protruding portion of the center terminal portion of the connector and the third contact piece portion of the second intermediate contact elastically contacts the outer peripheral surface of the outer terminal portion of the connector. Since the adapter housing and the connector housing are displaceable rotationally relative to each other about the central axis of the center terminal portion, the fitting workability is improved with no need to adjust the orientation of the connector with respect to the adapter.

In a preferred embodiment, the connector structure is configured such that, when the adapter housing and the connector housing are displaced relatively and rotationally with respect to each other, a contact portion of the first contact piece portion is displaced circumferentially in a sliding manner with respect to the outer peripheral surface of the center terminal portion and a contact portion of the third contact piece portion is displaced circumferentially in a sliding manner with respect to the outer peripheral surface of the outer terminal portion. In accordance with this arrangement, terminal connections using the adapter and the connector are substantially possible regardless of the orientation with respect to the opposing connector.

In a preferred embodiment, the adapter housing includes a fitting cylinder portion that has an annular engagement protrusion extending entirely circumferentially on the outer peripheral surface of the adapter housing, the connector housing includes a cylindrical portion centered on the central axis, the cylindrical portion split circumferentially with a slit that extends axially to the tip end to be radially and elastically deformable and having at least one locking protrusion on the inner peripheral surface of the cylindrical portion, and the connector structure is configured such that, when the fitting cylinder portion is inserted and fitted into the cylindrical portion, the locking protrusion overrides and engages the engagement protrusion so that the fitting cylinder portion is prevented from coming off.

In accordance with the arrangement above, when fitting between the adapter and the connector, the locking protrusion on the inner peripheral surface of the cylindrical portion on the connector side elastically overrides and engages the annular engagement protrusion on the outer peripheral surface of the fitting cylinder portion on the adapter side, which prevents the adapter and the connector from coming off. When the cylindrical portion on the connector side and the fitting cylinder portion on the adapter side rotate circumferentially relative to each other, the locking protrusion and the engagement protrusion also rotate circumferentially relative to each other. This allows for retention between the adapter and the connector regardless of the orientation with respect to the opposing connector.

In a preferred embodiment, the plurality of outer terminals are provided in a mutually insulated manner, the plurality of second intermediate contacts are provided correspondingly to the plurality of outer terminals, and a contact portion of each of the plurality of second intermediate contacts and a corresponding one of the outer terminals are positionally offset with respect to each other in the fitting direction. In accordance with this arrangement, fitting regardless of the orientation of the connector is made possible even if there may be three or more poles of opposing terminals and connector terminals.

In a preferred embodiment, the insulating portion includes an insulating member including an insulating cylinder portion into which the center terminal portion is inserted and fitted, and which is inserted and fitted into the outer terminal portion. The insulating cylinder portion is centered on the central axis. In accordance with this arrangement, insulation can be provided between the center terminal portion and the outer terminal portion, which are located concentrically, with such a simple structure using the insulating cylinder portion.

In a preferred embodiment, the center terminal includes a first wire connecting portion extending from the center terminal portion and to which a corresponding wire is connected, the outer terminal includes a second wire connecting portion extending from the outer terminal portion and to which a corresponding wire is connected, and the insulating member includes an insulating wall portion extending from the insulating cylinder portion and providing insulation between the first wire connecting portion and the second wire connecting portion. In accordance with this arrangement, insulation can be provided between the first wire connecting portion and the second wire connecting portion with such a simple structure using the insulating wall portion that is provided in a manner extending from the insulating cylinder portion.

In a preferred embodiment, the center terminal, the outer terminal, and the insulating member may be unitized. In accordance with this arrangement, assembling work can be facilitated.

In a preferred embodiment, the adapter housing includes a to-be-positioned portion to engage a positioning portion of the opposing housing so that the first intermediate contact and the second intermediate contact are aligned, respectively, with corresponding ones of the opposing terminals. In accordance with this arrangement, when preliminarily fitting the adapter with respect to the opposing connector, the intermediate contacts are easily positioned with respect to corresponding ones of the opposing terminals.

DESCRIPTION OF EMBODIMENTS

Preferred embodiments embodying the present invention will hereinafter be described with reference to the accompanying drawings.

Figure 1A:
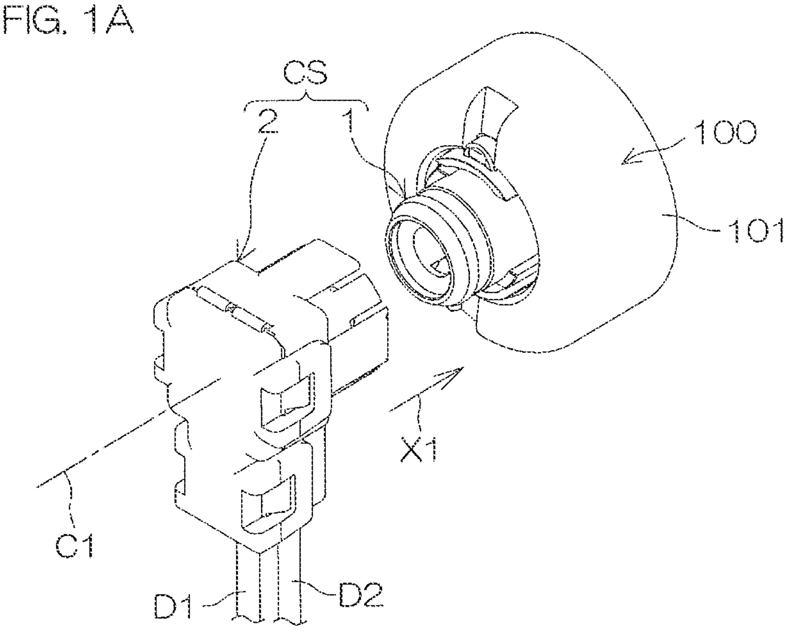
FIG. 1A is a schematic perspective view of a state before fitting between a connector and an adapter fitted preliminarily to an opposing connector of a connector structure according to a preferred embodiment of the present invention.
Figure 1B:
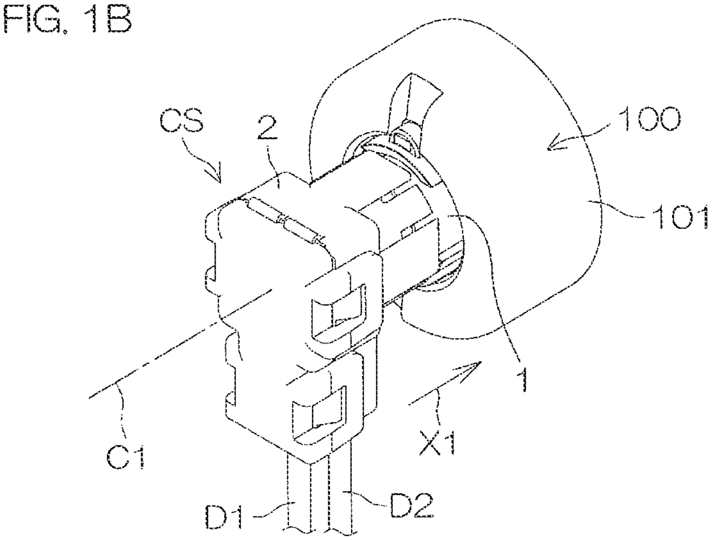
FIG. 1B is a schematic perspective view of the connector structure in a state fitted to the opposing connector.

FIGS. 1A and 1B are schematic perspective views showing a connector structure in use according to a preferred embodiment of the present invention. The connector structure CS includes an adapter 1 fitted preliminarily to an opposing connector 100 and a connector 2 arranged to be fitted to the adapter 1 in a fitting direction X1.

Figure 2:
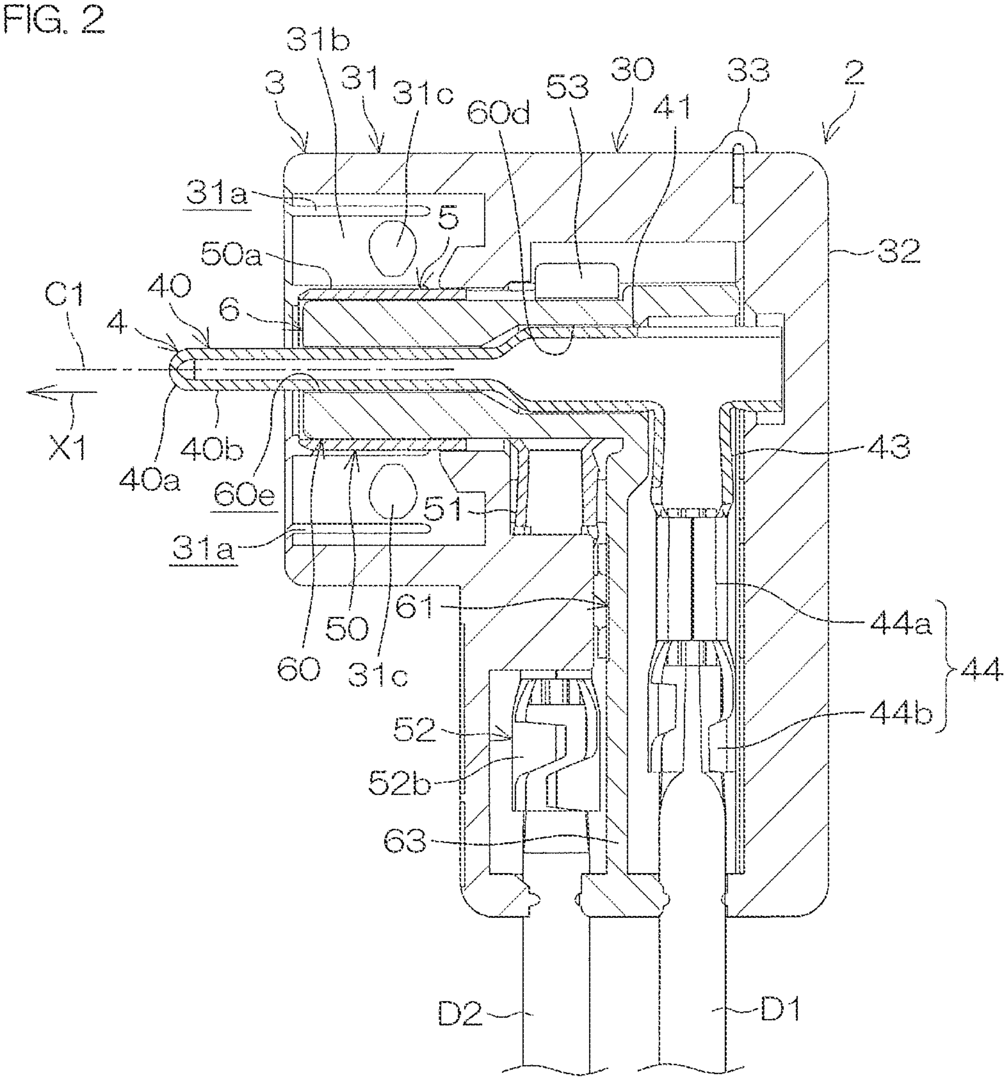
FIG. 2 is a cross-sectional view of the connector, as a component of the connector structure.
Figure 3:
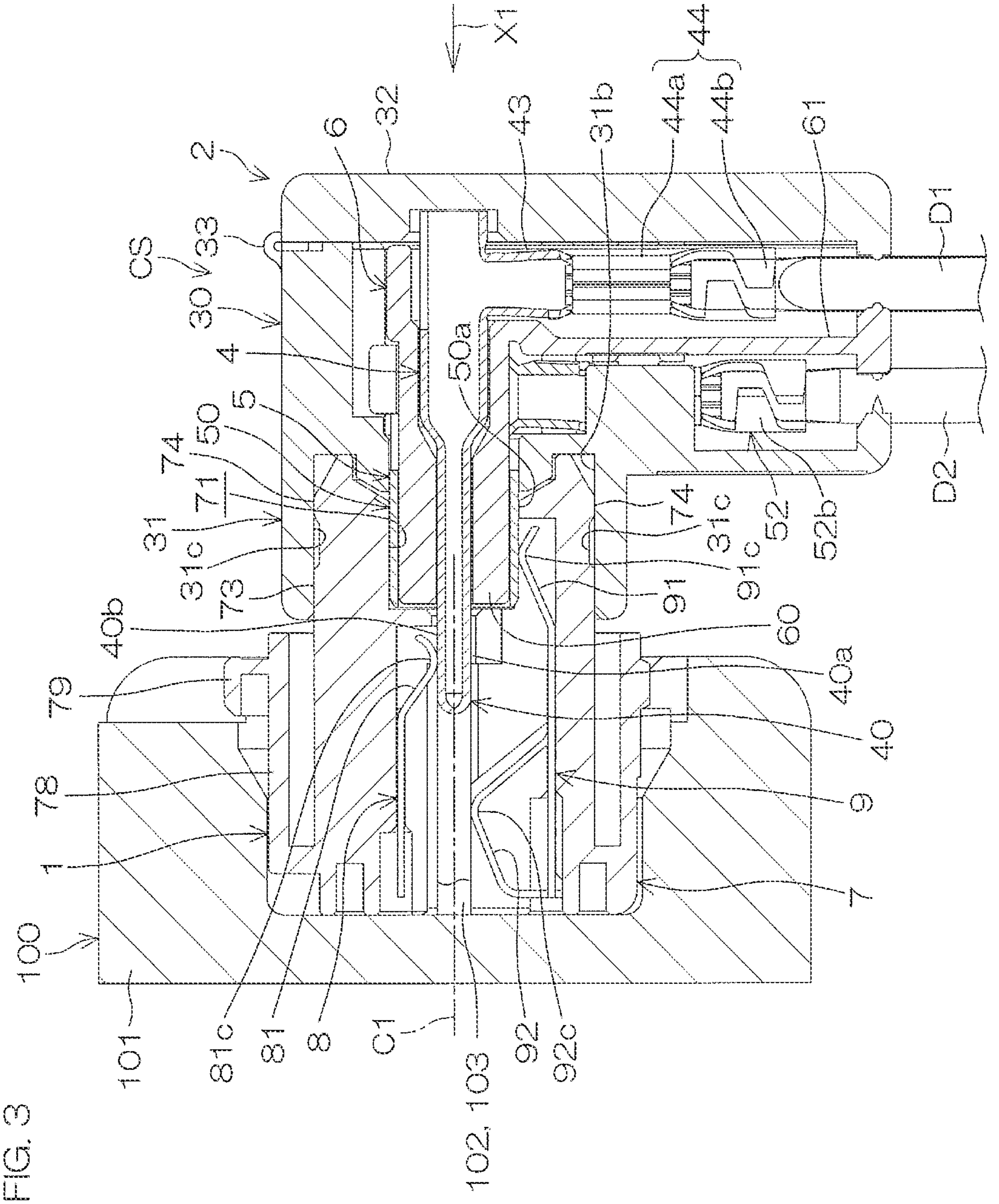
FIG. 3 is a cross-sectional view of the connector structure in a fitting state.

FIG. 2 is a cross-sectional view of the connector 2 and FIG. 3 is a cross-sectional view of the connector structure CS in a fitting state. As shown in FIG. 3, the opposing connector 100 includes an opposing housing 101 and a plurality of (for example, two) opposing terminals 102 and 103. The two opposing terminals 102, 103 are pin-shaped terminals housed and retained in the opposing housing 101 and extending in parallel with each other in the fitting direction X1.

Figure 4:
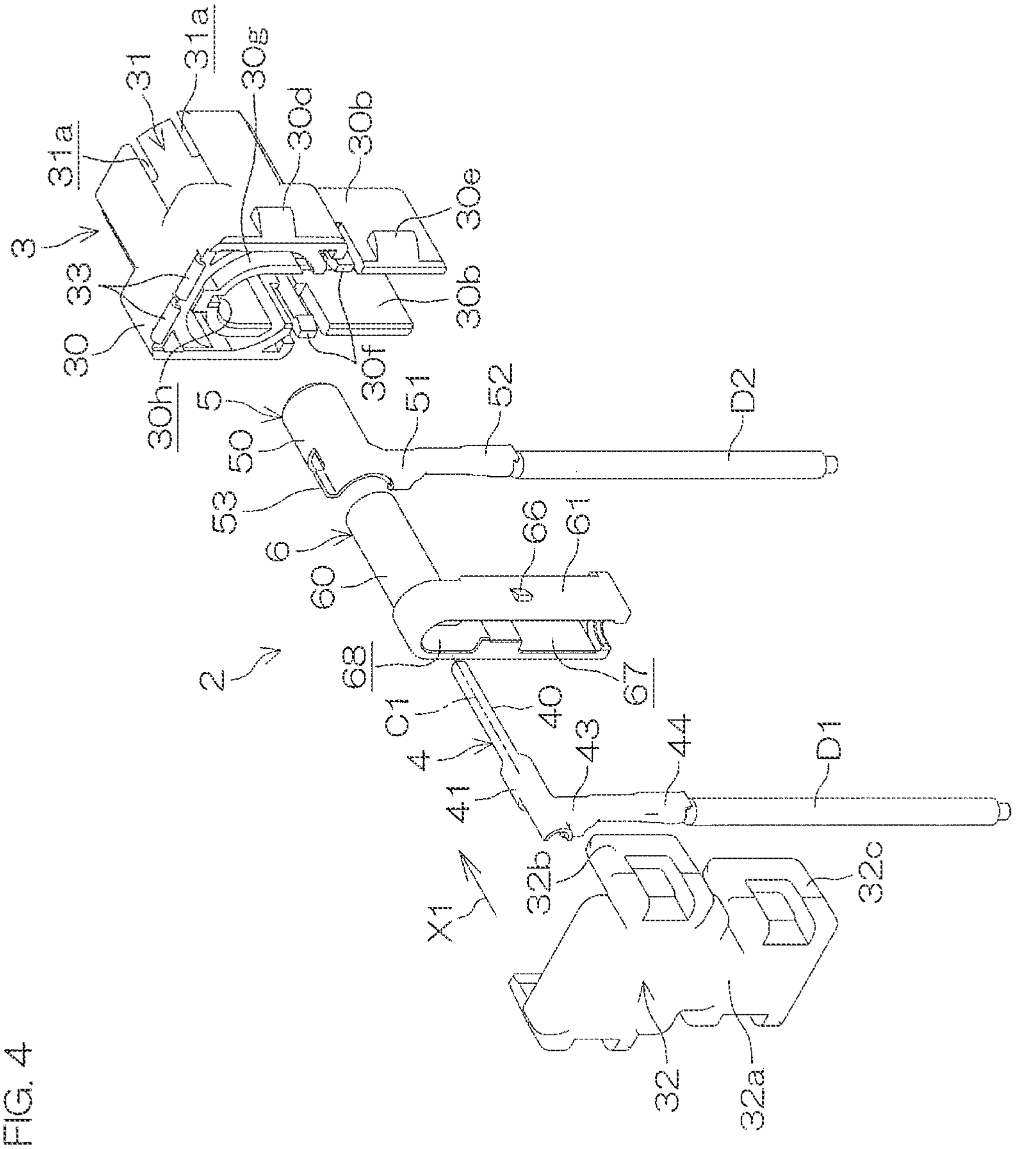
FIG. 4 is an exploded perspective view of the connector.

FIG. 4 is an exploded perspective view of the connector 2. As shown in FIG. 4, the connector 2 includes a connector housing 3, a center terminal 4, an outer terminal 5, and an insulating member 6. The connector housing 3 is formed of an insulating material. The center terminal 4 and the outer terminal 5 are formed of a conductive material. The center terminal 4 and the outer terminal 5 are supported on the connector housing 3. In FIG. 4, a main body portion 30 and a cover 32, which are components of the connector housing 3, are shown in a separated manner.

As shown in FIGS. 2 to 4, the center terminal 4 includes a pin-shaped center terminal portion 40 extending in a fitting direction X1. The center terminal portion 40 may have a hollow pin shape as shown. The center terminal portion 40 has a central axis C1. The outer terminal 5 includes a cylindrical outer terminal portion 50 that concentrically encloses the center terminal portion 40 with the interposed insulating member 6. That is, the outer terminal portion 50 shares the central axis C1 with the center terminal portion 40. The center terminal portion 40 includes a protruding portion 40 that protrudes from the outer terminal portion 50 in the fitting direction X1.

Specifically, the insulating member 6 is engaged with the connector housing 3 in an engageable and disengageable manner. The insulating member 6 is interposed between the center terminal 4 and the outer terminal 5 to provide insulation between the center terminal 4 and the outer terminal 5.

The adapter 1 includes an adapter housing 7, a first intermediate contact 8, and a second intermediate contact 9. The adapter housing 7 is formed of an insulating material. The adapter housing 7 is arranged to be fitted to the connector housing 3 in the fitting direction X1. The adapter housing 7 is displaceable relatively and rotationally with respect to the connector housing 3 about the central axis C1 of the center terminal 4.

The first intermediate contact 8 and the second intermediate contact 9 are formed of a conductive material and supported on the adapter housing 7.

The first intermediate contact 8 includes a fixed portion 80, a first contact piece portion 81, and a second contact piece portion 82. The fixed portion 80 is pressed and fixed into the adapter housing 7. The first contact piece portion 81 is provided in a manner cantilevered and extending on/from the fixed portion 80 and arranged to elastically contact the outer peripheral surface 40*b* of the protruding portion 40*a* of the center terminal portion 40. The second contact piece portion 82 is provided in a manner cantilevered and extending on/from the fixed portion 80 and arranged to elastically contact the corresponding opposing terminal 102.

The second intermediate contact 9 includes a fixed portion 90, a third contact piece portion 91, and a fourth contact piece portion 92. The fixed portion 90 is pressed and fixed into the adapter housing 7. The third contact piece portion 91 is provided in a manner cantilevered and extending on/from the fixed portion 90 and arranged to elastically contact the outer peripheral surface 50*a* of the outer terminal portion 50. The fourth contact piece portion 92 is provided in a manner cantilevered and extending on/from the fixed portion 90 and arranged to elastically contact the corresponding opposing terminal 103.

Next, the center terminal 4 will be described.

Figure 5A:
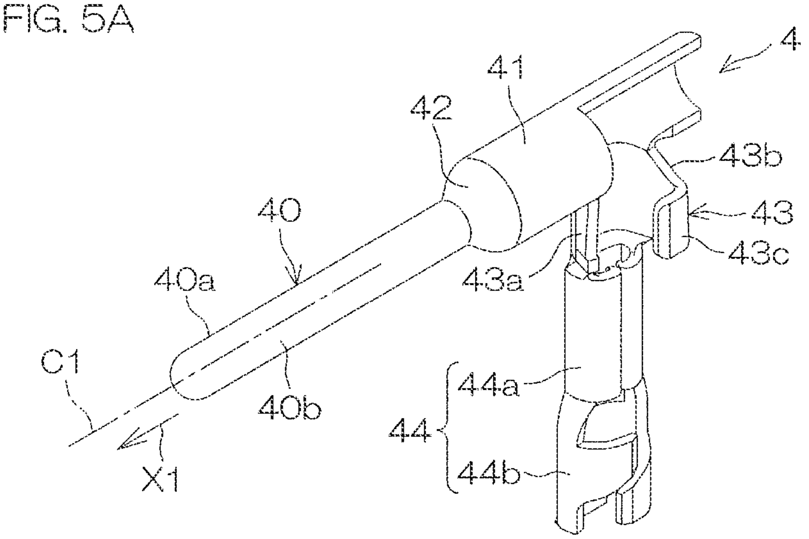
FIG. 5A is a perspective view of a center terminal of the connector.
Figure 5B:
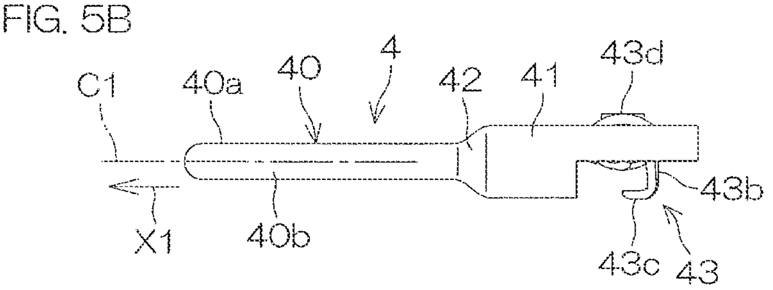
FIG. 5B is a plan view of the center terminal.
Figure 5C:
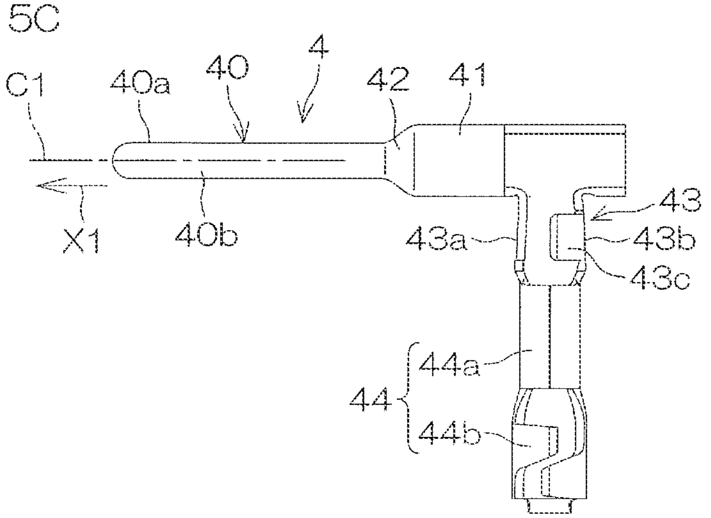
FIG. 5C is a side view of the center terminal.

FIG. 5A is a perspective view of the center terminal 4, FIG. 5B is a plan view of the center terminal 4, and FIG. 5C is a side view of the center terminal 4.

As shown in FIGS. 5A to 5C, the center terminal 4 includes a center terminal portion 40, a support portion 41, a tapered portion 42, a positioning wall portion 43, and a first wire connecting portion 44. The center terminal 4 is formed by using sheet metal. The center terminal portion 40 and the support portion 41 are formed in a cylindrical shape about the central axis C1. The center terminal portion 40 is provided in a manner extending from an axial end of the support portion 41 through the tapered portion 42 to have a diameter smaller than that of the support portion 41.

A rear half portion of the support portion 41 (a portion opposite to the center terminal portion 40 side) is cut open. The first wire connecting portion 44 is provided in a manner extending downward from the cut-open portion of the support portion 41 through the positioning wall portion 43 orthogonally to the central axis C1. Specifically, the first wire connecting portion 44 includes a wire barrel 44*a* to which the core of a wire D1 (see FIG. 4) is connected and an insulation barrel 44*b* to which the insulating coating portion of the wire D1 is connected.

The positioning wall portion 43 includes a pair of wall portions 43*a*, 43*b* opposing each other in a direction parallel with the central axis C1 and a pair of wall portions 43*c*, 43*d* opposing each other in a direction orthogonal to the central axis C1.

Next, the outer terminal 5 will be described.

Figure 6A:
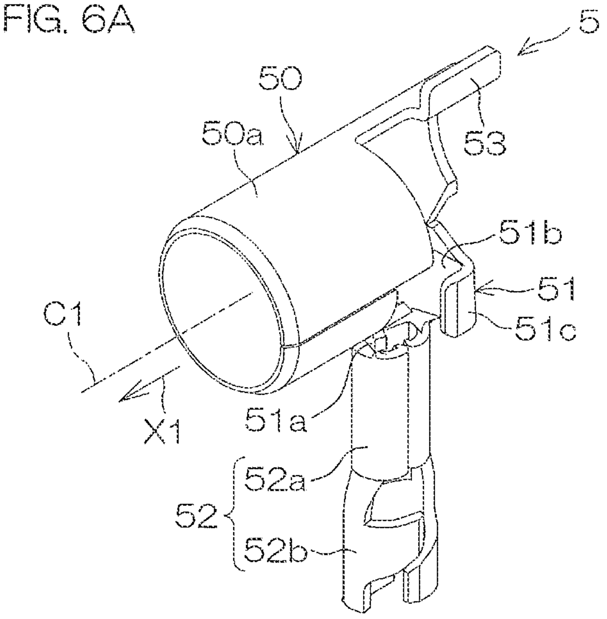
FIG. 6A is a perspective view of an outer terminal of the connector.
Figure 6B:
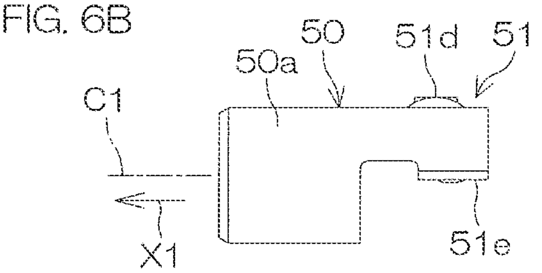
FIG. 6B is a plan view of the outer terminal.
Figure 6C:
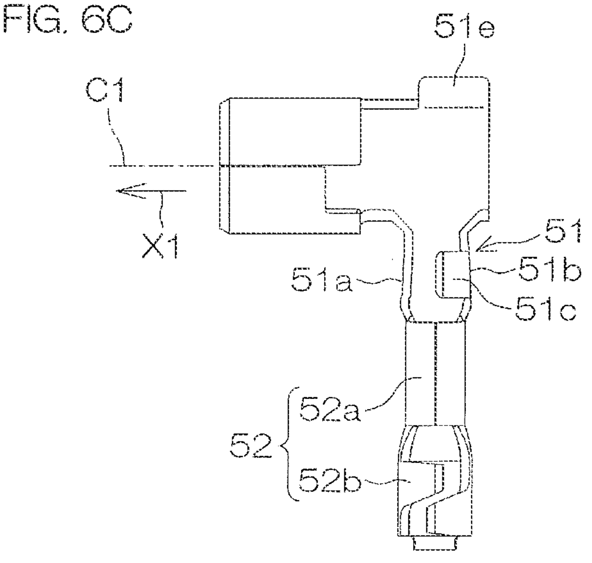
FIG. 6C is a side view of the outer terminal.

FIG. 6A is a perspective view of the outer terminal 5, FIG. 6B is a plan view of the outer terminal 5, and FIG. 6C is a side view of the outer terminal 5.

As shown in FIGS. 6A to 6C, the outer terminal 5 includes an outer terminal portion 50, a positioning wall portion 51, a second wire connecting portion 52, and a positioning protrusion 53. The outer terminal 5 is formed by using sheet metal. The outer terminal portion 50 has a cylindrical shape centered on the central axis C1. The positioning wall portion 51 is formed by cut-opening an axial end of the outer terminal portion 50. The positioning wall portion 51 includes a pair of wall portions 51*a*, 51*b* opposing each other in a direction parallel with the central axis C1 and a pair of wall portions 51*c*, 51*d* opposing each other in a direction orthogonal to the central axis C1.

The second wire connecting portion 52 is provided in a manner extending downward from the outer terminal portion 50 through the positioning wall portion 51 orthogonally to the central axis C1. Specifically, the second wire connecting portion 52 includes a wire barrel 52*a* to which the core of a wire D2 (see FIG. 4) is connected and an insulation barrel 52*b* to which the insulating coating portion of the wire D2 is connected.

Next, the insulating member 6 will be described.

Figure 7C:
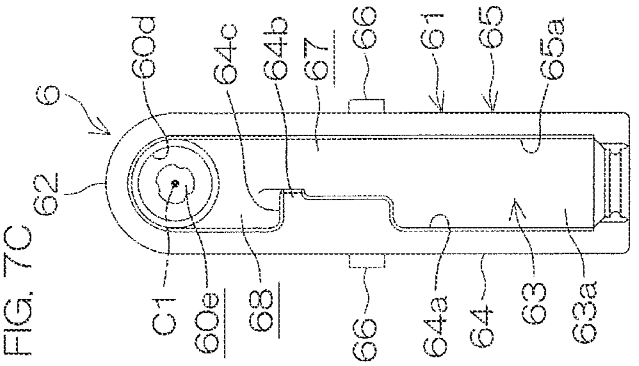
FIG. 7C is a rear view of the insulating member.
Figure 7B:
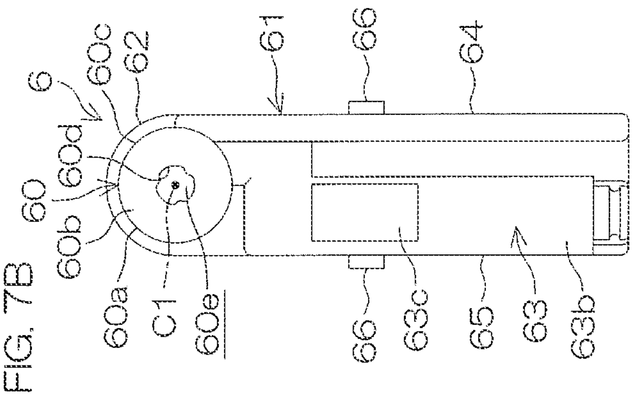
FIG. 7B is a front view of the insulating member.
Figure 7A:
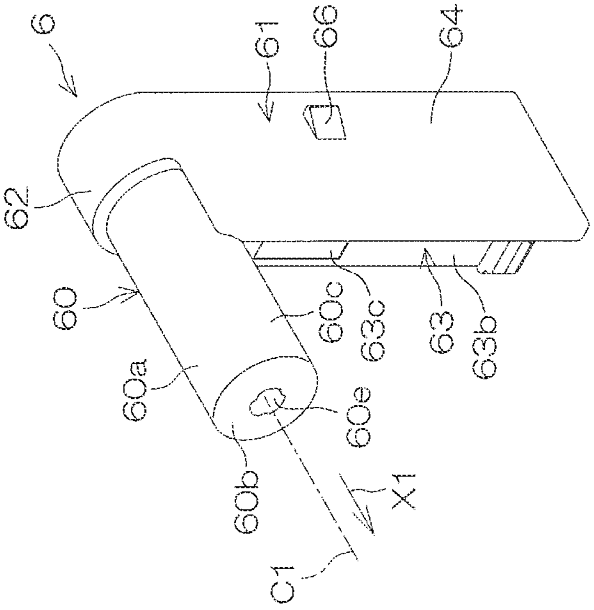
FIG. 7A is a perspective view of an insulating member.

FIG. 7A is a perspective view of the insulating member 6, FIG. 7B is a front view of the insulating member 6, and FIG. 7C is a rear view of the insulating member 6.

As shown in FIGS. 7A to 7C, the insulating member 6 includes an insulating cylinder portion 60 and an insulating wall portion 61. The insulating cylinder portion 60 mainly functions to provide insulation between the center terminal portion 40 of the center terminal 4 and the outer terminal portion 50 of the outer terminal 5. The insulating wall portion 61 mainly functions to provide insulation between the first wire connecting portion 44 of the center terminal portion 40 of the center terminal 4 and the second wire connecting portion 52 of the outer terminal 5.

Specifically, the insulating cylinder portion 60 includes a peripheral wall portion 60*a*, an end wall portion 60*b*, an outer peripheral surface 60*c*, an inner peripheral surface 60*d*, and an insertion hole 60*e*. The end wall portion 60*b* is located at one end of the insulating cylinder portion 60. The insertion hole 60*e* is formed in the end wall portion 60*b*.

As shown in FIG. 2, the center terminal portion 40 and the support portion 41 of the center terminal 4 are inserted and fitted into the insulating cylinder portion 60. The insulating cylinder portion 60 is inserted and fitted into the outer terminal portion 50 of the outer terminal 5. One end of the outer terminal portion 50 is aligned with one end of the insulating cylinder portion 60.

The inner peripheral surface 60*d* of the insulating cylinder portion 60 is shaped to include a small diameter portion along the outer peripheral surface 40*b* of the center terminal portion 40, a large diameter portion along the outer peripheral surface of the support portion 41, and a tapered portion adjacent to the tapered portion 42. A part of the center terminal portion 40 protrudes externally from the insulating cylinder portion 60 (i.e. from the outer terminal portion 50) through the insertion hole 60*e* to form the protruding portion 40*a*.

As shown in FIGS. 7A to 7C, the insulating wall portion 61 includes a top wall portion 62, a front wall portion 63, a pair of side wall portions 64, 65, a pair of engagement protrusions 66, and a housing portion 67. The top wall portion 62 has a semi-cylindrical shape and connects the upper ends of the pair of side wall portions 64, 65 in an inverted U shape. The housing portion 67 is formed by the top wall portion 62, the front wall portion 63, and the pair of side wall portions 64, 65, and mainly houses the positioning wall portion 43 and the first wire connecting portion 44 of the center terminal 4 (see FIG. 2). The front wall portion 63 is interposed between the first wire connecting portion 44 of the center terminal 4 and the second wire connecting portion 52 of the outer terminal 5 and functions to provide insulation between the wire connecting portions 44, 52.

The insulating cylinder portion 60 is provided in a manner extending frontward from the front wall portion 63. The interior of the insulating cylinder portion 60 is in communication with the interior of the housing portion 67 through an insertion hole that runs through the front wall portion 63.

As shown in FIGS. 7C, a convex portion 64*b* is formed in a manner protruding from the inner surface 64*a* of the side wall portion 64. Within the housing portion 67, the inner surfaces of the top wall portion 62, the front wall portion 63, and the pair of side wall portions 64, 65 and the upper surface of the convex portion 64*b* define a retaining portion 68 arranged to fit and retain the positioning wall portion 43 of the center terminal 4.

Specifically, in a state where the center terminal 4 shown in FIGS. 5A to 5C is attached to the insulating member 6 shown in FIGS. 7A to 7C, the center terminal portion 40 and the support portion 41 of the center terminal 4 are inserted through the insulating cylinder portion 60 so that a part of the center terminal portion 40 protrudes from the insulating cylinder portion 60 as the protruding portion 40. The wall portion 43*c* of the positioning wall portion 43 of the center terminal 4 is laid along the inner surface 64*a* of the side wall portion 64 of the insulating wall portion 61 of the insulating member 6, and the lower edge of the wall portion 43*c* is received by the upper surface 64*c* of the convex portion 64*b*. The wall portion 43*d* of the positioning wall portion 43 of the center terminal 4 is laid along the inner surface 65*a* of the side wall portion 65 of the insulating wall member 6. The wall portion 43*a* of the positioning wall portion 43 of the center terminal 4 is received by the inner surface 63*a* (corresponding to the back surface) of the front wall portion 63 of the insulating wall portion 61 of the insulating member 6. The center terminal 4 is thus positioned with respect to the insulating member 6 in three orthogonal directions including the direction of the central axis C1.

A recessed portion 63*c* is formed in a manner protruding from the outer surface 63*b* (corresponding to the front surface) of the front wall portion 63. In a state where the outer terminal 5 shown in FIGS. 6A to 6C is attached to the insulating member 6 shown in FIGS. 7A to 7C, the outer terminal portion 50 of the outer terminal 5 is fitted externally to the insulating cylinder portion 60 of the insulating member 6. Also, the wall portion 51*b* of the positioning wall portion 51 of the outer terminal 5 is received by the outer surface 63*b* of the front wall portion 63 of the insulating wall portion 61 of the insulating member 6.

Figure 9C:
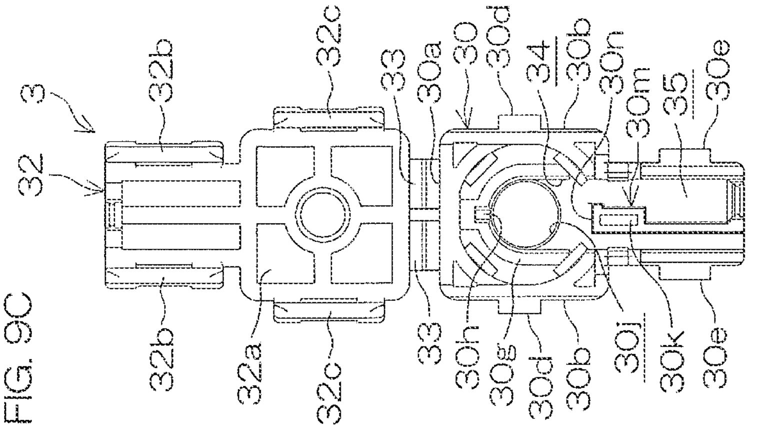
FIGS. 9A, 9B, and 9C are a perspective view, a front view, and a rear view, respectively, of a connector housing in an open state.

The positioning protrusion 53 of the outer terminal 5 is inserted and fitted into a corresponding engagement groove 30*h* of the connector housing 3 (see FIG. 9*c*).

Next, the connector housing 3 will be described.

Figure 8A:
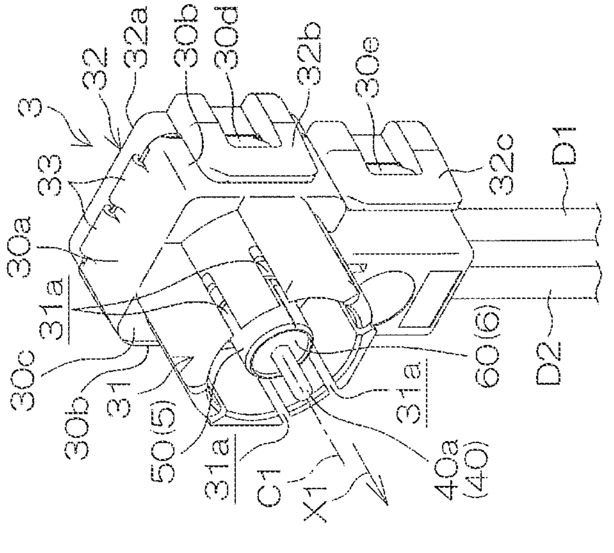
FIG. 8A is a schematic perspective view of the connector.
Figure 8B:
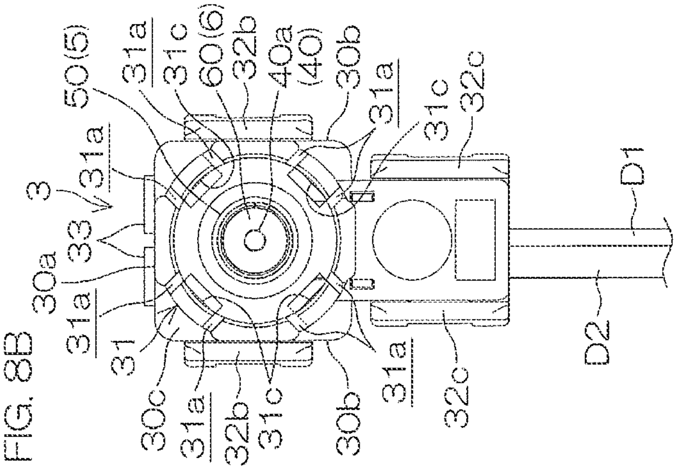
FIG. 8B is a front view of the connector.
Figure 8C:
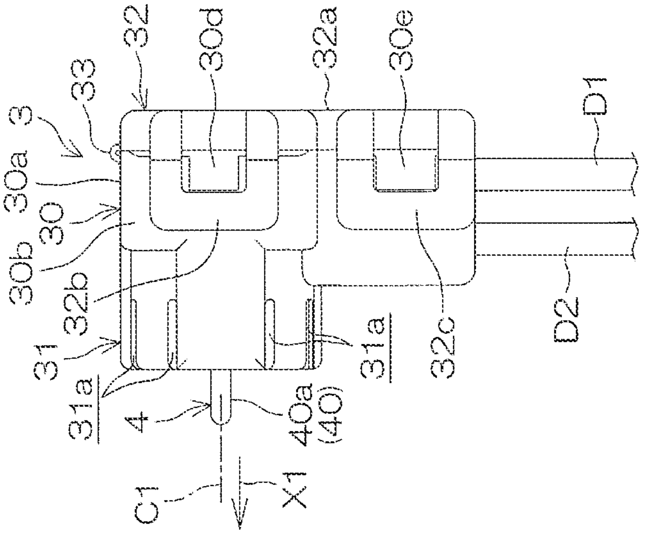
FIG. 8C is a side view of the connector.
Figure 9B:
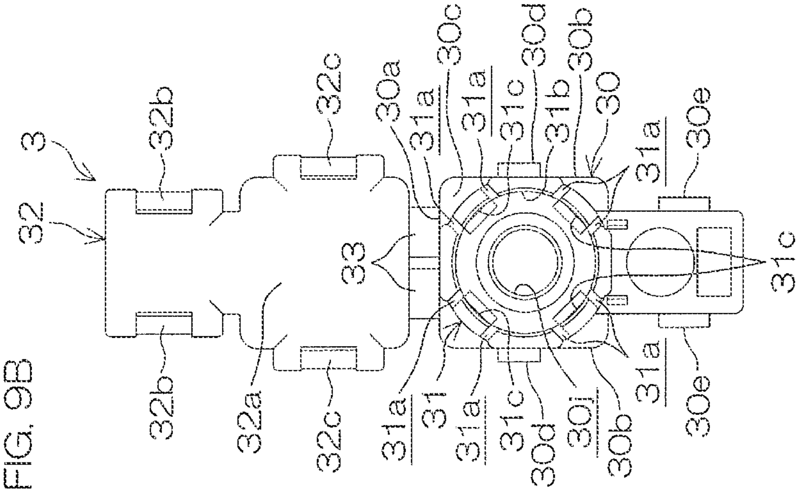
Figure 9A:
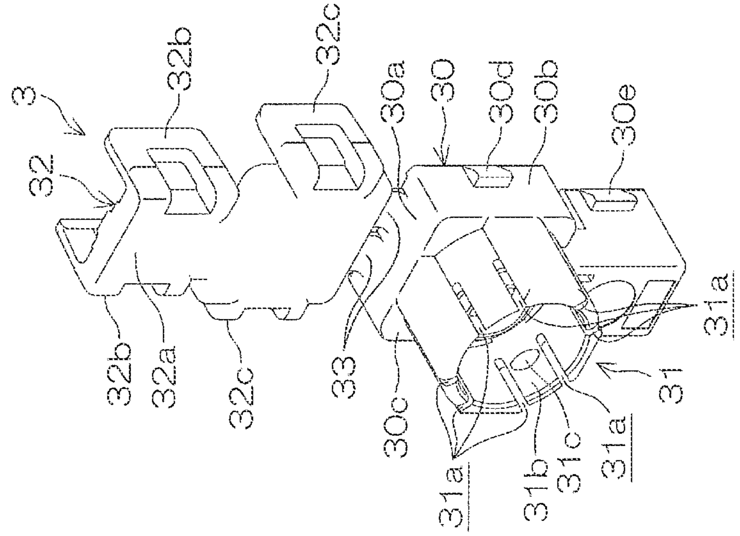

FIGS. 8A, 8B, and 8C are a schematic perspective view, a front view, and a side view, respectively, of the connector 2. FIGS. 9A, 9B, and 9C are a perspective view, a front view, and a rear view, respectively, of the connector housing 3 in an open state.

Referring to FIGS. 8A, 8B, 8C, 9A, 9B, and 9C, the connector housing 3 includes a main body portion 30, a cylindrical portion 31, a cover 32, and a flexible connecting portion 33. The main body portion 30 has an approximately rectangular parallelepiped shape and includes a top wall portion 30*a*, a pair of side wall portions 30*b*, and a front wall portion 30*c*. The main body portion 30 is opened rearward and the rear opening portion of the main body portion 30 is closed by the cover 32 in an assembled state.

The cylindrical portion 31 is centered on a central axis that coincides with the central axis C1. The cylindrical portion 31 is split circumferentially with a plurality of slits 31*a* that extend axially to the tip end to be radially and elastically deformable. A locking protrusion 31*c* is formed in a manner protruding from the inner peripheral surface 31*b* of the cylindrical portion 31 (see FIGS. 8A, 8B).

At least one locking protrusion 31*c* may be provided. In the example of FIG. 8B, four locking protrusions 31*c* are provided at circumferentially regular intervals. The locking protrusions 31*c* are arranged to elastically override and engage an annular engagement protrusion 74 (see FIG. 10) of the adapter 1.

The flexible connecting portion 33 connects the rear edge of the upper wall portion 30*a* of the main body portion 30 and the cover 32 to serve as a hinge when the cover 32 is rotationally opened and closed. The cover 32 includes a plate-shaped main body portion 32*a* and two pairs of left and right U-shaped elastically deformable grappling arms 32*b*, 32*c*.

Two pairs of engagement protrusions 30*d*, 30*e* arranged to be engaged, respectively, by the corresponding pairs of grappling arms 32*b*, 32*c* of the cover 32 are formed in a manner protruding from the pair of side wall portions 30*b* of the main body portion 30. The grappling arms 32*b*, 32*c* are arranged to elastically override and engage, respectively, the corresponding engagement protrusions 30*d*, 30*e* when the cover 32 is closed. This causes the cover 32 to be locked in a closed state.

An elastic hook portion 30*f* (see FIG. 4) arranged to engage a corresponding one of the engagement protrusions 66 provided on the insulating member 6 is provided at the rear edge of each side wall portion 30*b* of the main body portion 30. When each elastic hook portion 30*f* engages the corresponding engagement protrusion 66 of the insulating member 6, the insulating member 6 is retained within the connector housing 3.

As shown in FIGS. 9C, a terminal portion housing portion 34 and a connecting space portion 35 are defined within the main body portion 30. The terminal portion housing portion 34 mainly houses the center terminal portion 40 and the outer terminal portion 50 (see FIG. 2). The connecting space portion 35 mainly houses the first wire connecting portion 44 of the center terminal 4 and the second wire connecting portion 52 of the outer terminal 5, and the wire connecting portions 44, 52 are connected, respectively, with the corresponding wires D1, D2 within the connecting space portion 35.

The terminal portion housing portion 34 is defined by an inverted U-shaped first delimiting wall portion 30*g* provided in the main body portion 30. An engagement groove 30*h* with which the positioning protrusion 53 of the outer terminal 5 is engaged is formed in a top portion of the first delimiting wall portion 30*g*. An insertion hole 30*j* through which the terminal portion housing portion 34 is opened externally is formed in the front wall portion 30*c* of the main body portion 30. The center terminal portion 40, the insulating cylinder portion 60, and the outer terminal portion 50 partially protrudes externally through the insertion hole 30*j*.

The connecting space portion 35 is located below the terminal portion housing portion 34 in communication with each other. The wires D1, D2 drawn from below into the connecting space portion 35 (see FIG. 2) are connected, respectively, to the first wire connecting portion 44 of the center terminal 4 and the second wire connecting portion 52 of the outer terminal 5 within the connecting space portion 35 corresponding thereto. Also, within the connecting space portion 35, a convex portion 30*m* is formed in a manner protruding from the front wall portion 30*c*. The wall portion 51*c* of the positioning wall portion 51 of the outer terminal 5 inserted within the terminal portion housing portion 34 is received by the upper surface 30*n* of the lower convex portion 30*m*. A punched hole 30*k* is formed in the convex portion 30*m*.

Next, the adapter 1 will be described.

Figure 10:
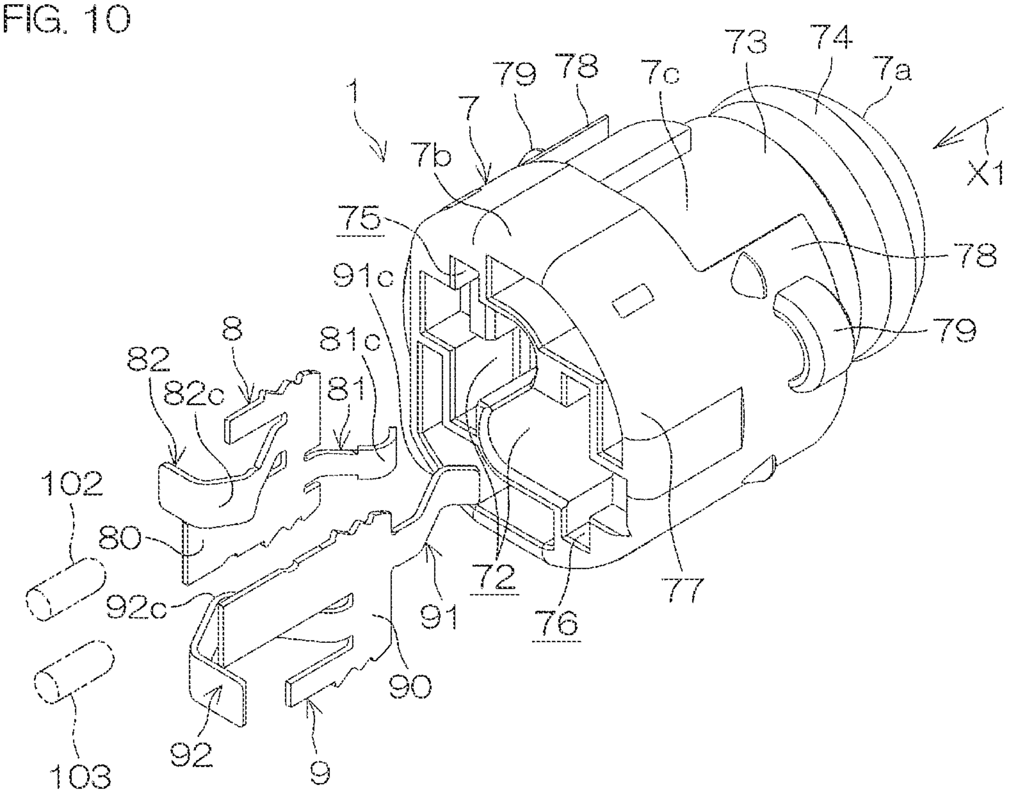
FIG. 10 is an exploded perspective view of the adapter.
Figure 11:
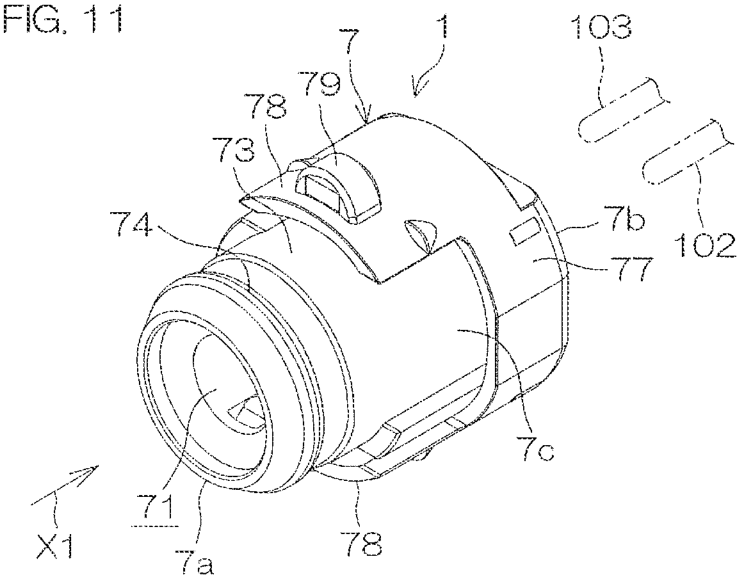
FIG. 11 is a perspective view of the adapter.
Figure 12A:
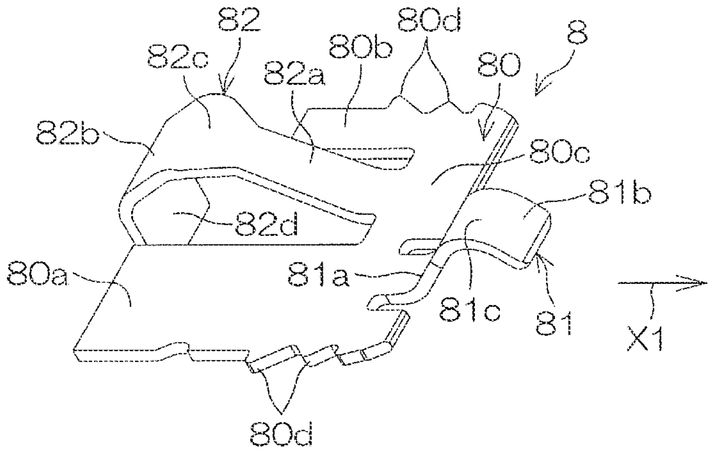
FIG. 12A is a perspective view of a first intermediate contact, as a component of the adapter.
Figure 12B:
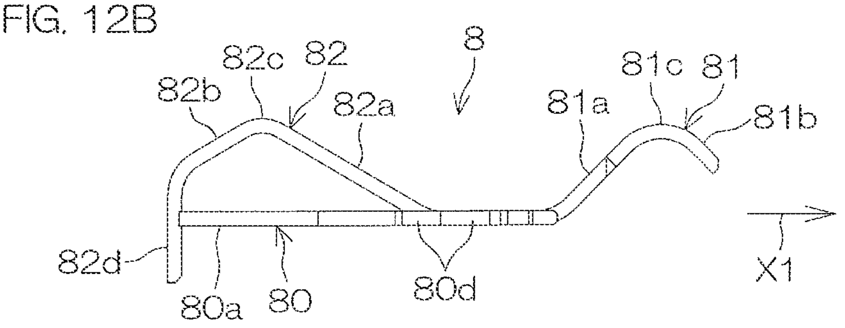
FIGS. 12B and 12C are side views of the first intermediate contact when viewed in their respective different directions.
Figure 12C:
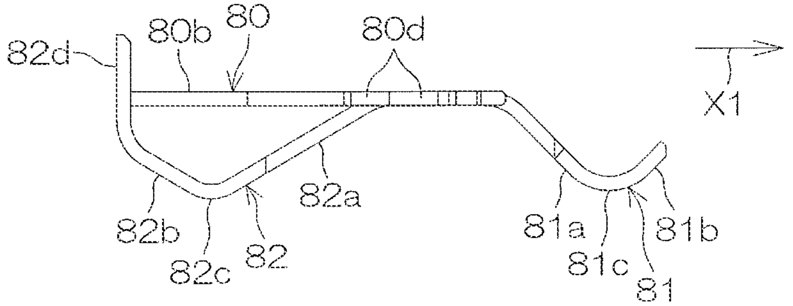
Figure 13A:
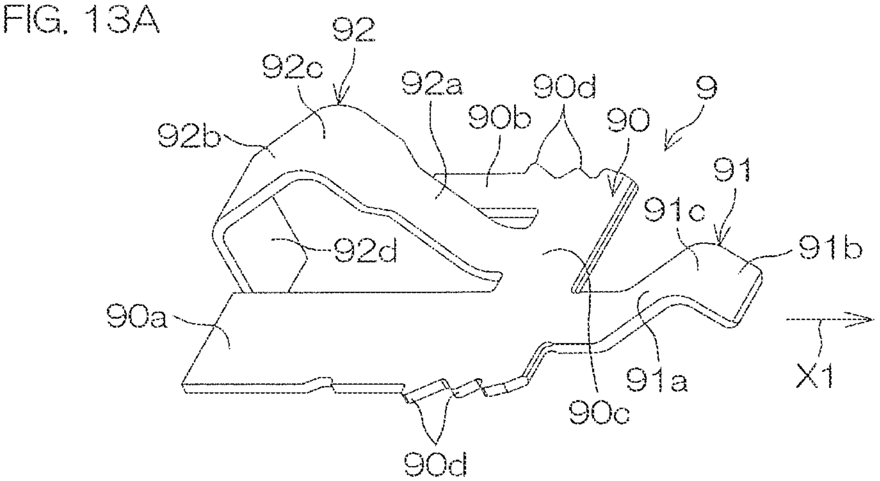
FIGS. 13A and 13B are a perspective view and a side view, respectively, of a second intermediate contact, as a component of the adapter.
Figure 13B:
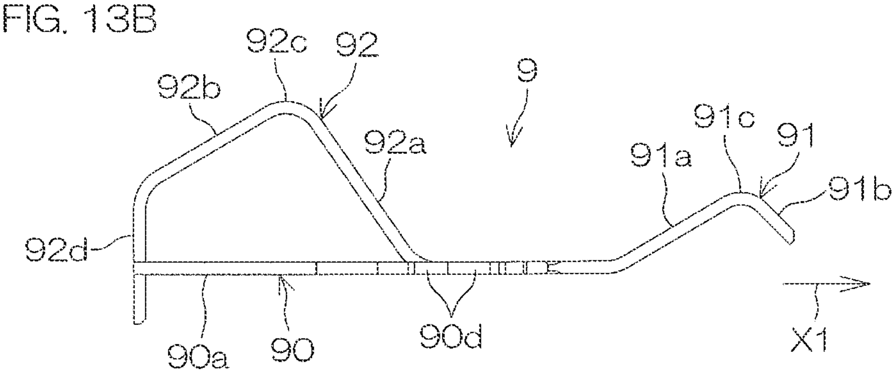
Figure 14C:
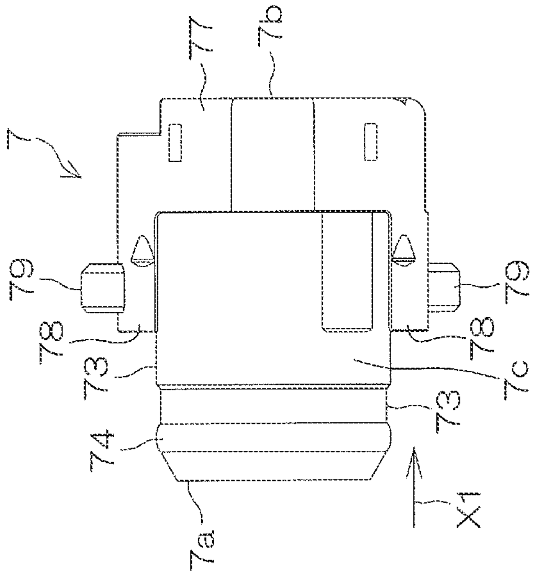
FIGS. 14A, 14B, and 14C are a front view, a rear view, and a side view, respectively, of the adapter.
Figure 14B:
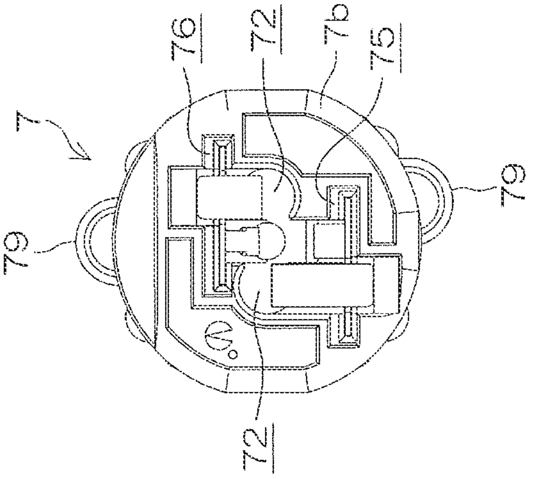
Figure 14A:
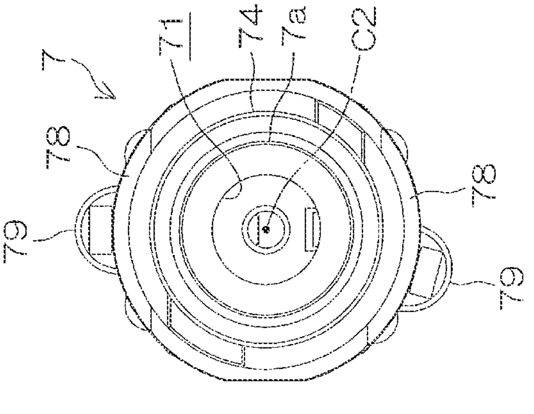
Figure 15:
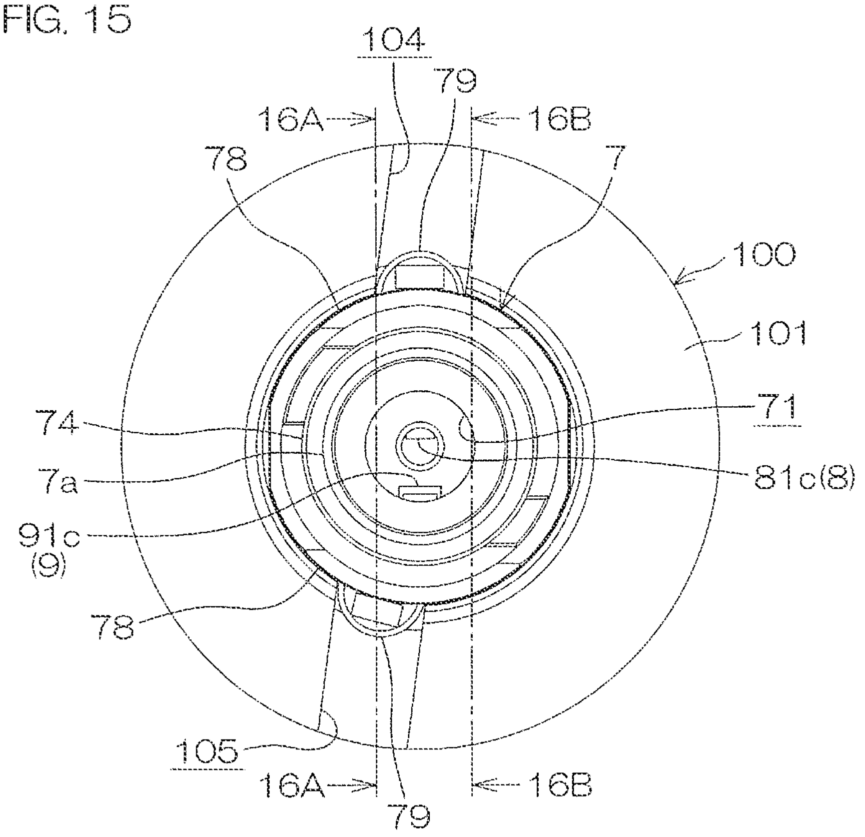
FIG. 15 is an enlarged front view of the adapter in a state attached to the opposing connector.
Figure 16A:
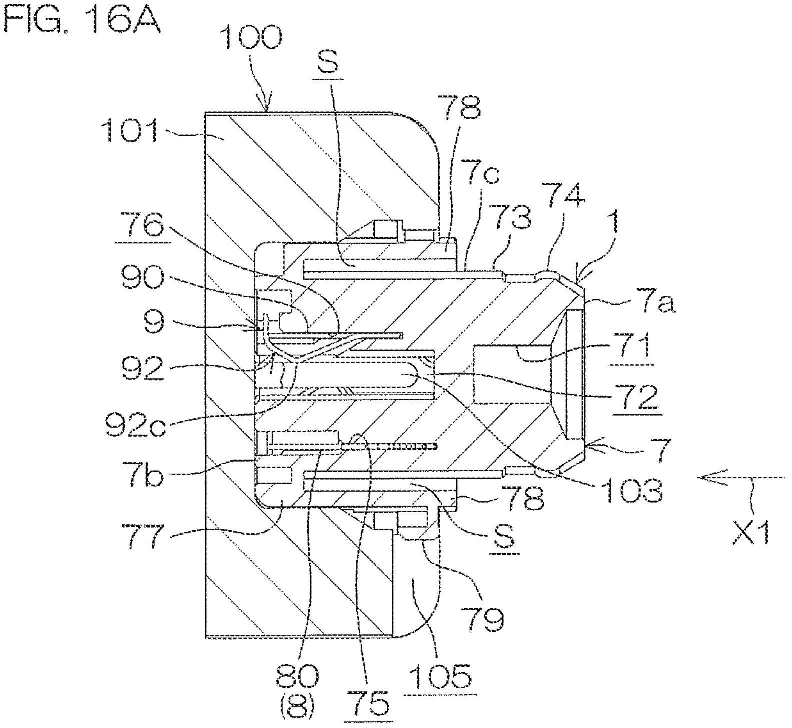
FIG. 16A is a cross-sectional view of the adapter in a state attached to the opposing connector, taken along line 16A-16A in FIG. 15.
Figure 16B:
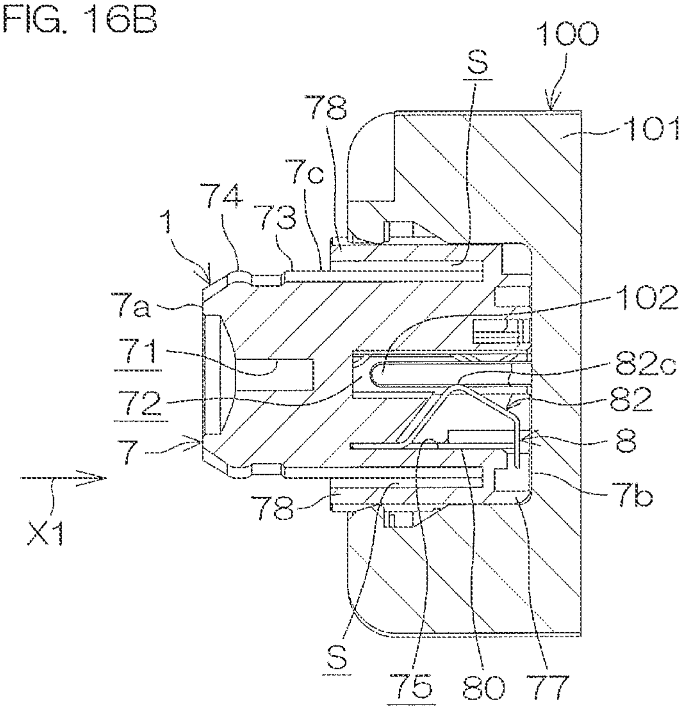
FIG. 16B is a cross-sectional view of the adapter in a state attached to the opposing connector, taken along line 16B-16B in FIG. 15.
Figure 17A:
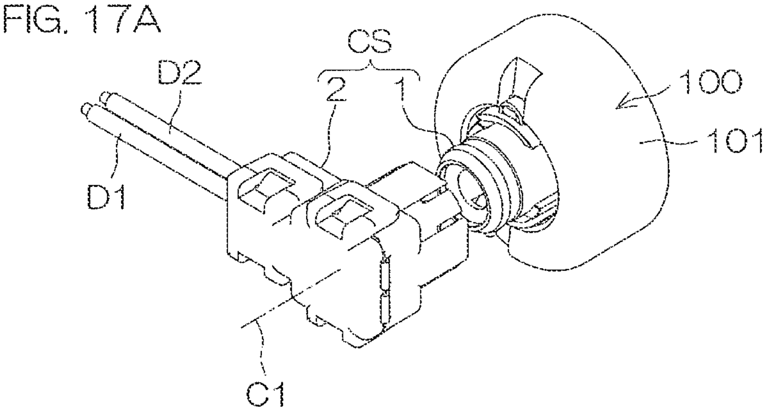
FIGS. 17A, 17B, and 17C are perspective views of the connector structure in a state fitted to the opposing connector in their respective different orientations.
Figure 17B:
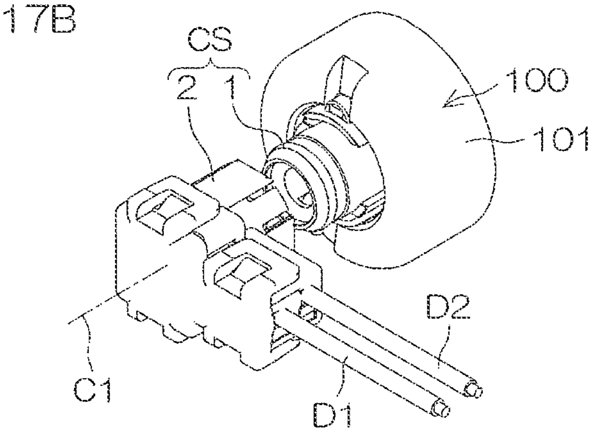
Figure 17C:
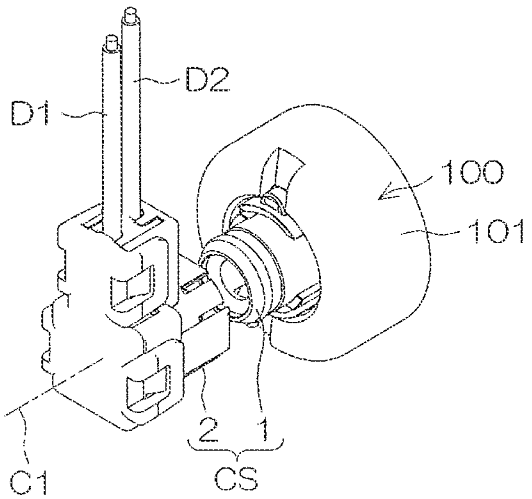

FIG. 10 is an exploded perspective view of the adapter 1. FIG. 11 is a perspective view of the adapter 1. FIG. 12A is a perspective view of the first intermediate contact 8 and FIGS. 12B and 12C are side views of the first intermediate contact 8 when viewed in their respective different directions. FIGS. 13A and 13B are a perspective view and a side view, respectively, of the second intermediate contact 9. FIGS. 14A, 14B, and 14C are a front view, a rear view, and a side view, respectively, of the adapter 1. FIG. 15 is an enlarged front view of the adapter 1 in a state attached to the opposing connector 100. FIG. 16A is a cross-sectional view of the adapter 1 in a state attached to the opposing connector, taken along line 16A-16A in FIG. 15. FIG. 16B is a cross-sectional view of the adapter 1 in a state attached to the opposing connector 100, taken along line 16B-16B in FIG. 15.

As shown in FIG. 10, the adapter 1 includes an adapter housing 7, a first intermediate contact 8, and a second intermediate contact 9. The first intermediate contact 8 is arranged to be connected with the opposing terminal 102 and the second intermediate contact 9 is arranged to be connected with the opposing terminal 103.

The first intermediate contact 8 will first be described.

As shown in FIGS. 10, 12A, 12B, and 12C, the first intermediate contact 8 includes a fixed portion 80, a first contact piece portion 81, and a second contact piece portion 82. The fixed portion 80 includes a first fixed piece portion 80*a*, a second fixed piece portion 80*b*, and a bridge portion 80*c*. The bridge portion 80*c* provides connection between one ends of the first fixed piece portion 80*a* and the second fixed piece portion 80*b*. The first fixed piece portion 80*a* is formed wider than the second fixed piece portion 80*b*. Press-fit protrusions 80*d* are formed in a manner protruding from the outside surfaces of the first fixed piece portion 80*a* and the second fixed piece portion 80*b*.

The first contact piece portion 81 is provided in a manner cantilevered and extending on/from one end of the first fixed piece portion 80*a*. The first contact piece portion 81 includes a first slope portion 81*a*, a second slope portion 81*b*, and a contact portion 81*c*. The first slope portion 81*a* and the second slope portion 81*b* are sloped in opposite directions to form an angle, and the contact portion 81*c* is provided at the top portion of the angle. The contact portion 81*c* of the first contact piece portion 81 is arranged to elastically contact the outer peripheral surface 40*b* of the protruding portion 40*a* of the center terminal portion 40 of the connector 2.

The second contact piece portion 82 is provided in a manner cantilevered and extending on/from the bridge portion 80*c* to the opposite side of the first contact piece portion 81. The second contact piece portion 82 includes a first slope portion 82*a*, a second slope portion 82*b*, a contact portion 82*c*, and an extending piece portion 82*d*. The first slope portion 82*a* and the second slope portion 82*b* are sloped in opposite directions to form an angle, and the contact portion 82*c* is provided at the top portion of the angle. The contact portion 82*c* of the second contact piece portion 82 protrudes on the same side as the contact portion 81*c* of the first contact piece portion 81. The extending piece portion 82*d* is provided in a manner extending from the tip end of the second slope portion 82*b* approximately orthogonally to the fixed portion 80.

Next, the second intermediate contact 9 will be described.

As shown in FIGS. 10, 13A, and 13B, the second intermediate contact 9 includes a fixed portion 90, a third contact piece portion 91, and a fourth contact piece portion 92. The fixed portion 90 includes a first fixed piece portion 90*a*, a second fixed piece portion 90*b*, and a bridge portion 90*c*. The bridge portion 90*c* provides connection between one ends of the first fixed piece portion 90*a* and the second fixed piece portion 90*b*. The first fixed piece portion 90*a* is formed wider than the second fixed piece portion 90*b*. Press-fit protrusions 90*d* are formed in a manner protruding from the outside surfaces of the first fixed piece portion 90*a* and the second fixed piece portion 90*b*.

The third contact piece portion 91 is provided in a manner cantilevered and extending on/from one end of the first fixed piece portion 90*a*. The third contact piece portion 91 includes a first slope portion 91*a*, a second slope portion 91*b*, and a contact portion 91*c*. The first slope portion 91*a* and the second slope portion 91*b* are sloped in opposite directions to form an angle, and the contact portion 91*c* is provided at the top portion of the angle. The contact portion 91*c* of the third contact piece portion 91 is arranged to elastically contact the outer peripheral surface 50*a* of the outer terminal portion 50 of the connector 2.

The fourth contact piece portion 92 is provided in a manner cantilevered and extending on/from the bridge portion 90*c* to the opposite side of the third contact piece portion 91. The fourth contact piece portion 92 includes a first slope portion 92*a*, a second slope portion 92*b*, a contact portion 92*c*, and an extending piece portion 92*d*. The first slope portion 92*a* and the second slope portion 92*b* are sloped in opposite directions to form an angle, and the contact portion 92*c* is provided at the top portion of the angle. The contact portion 92*c* of the fourth contact piece portion 92 protrudes on the same side as the contact portion 91*c* of the third contact piece portion 91. The extending piece portion 92*d* is provided in a manner extending from the tip end of the second slope portion 92*b* approximately orthogonally to the fixed portion 90.

Next, the adapter housing 7 will be described with reference to FIGS. 10, 11, 14A, 14B, 14C, 15, 16A, and 16B. The adapter housing 7 includes a first end portion 7*a*, a second end portion 7*b*, an outer peripheral portion 7*c*, a first terminal insertion recessed portion 71, a pair of second terminal insertion recessed portions 72, a fitting cylinder portion 73, an annular engagement protrusion 74, a first intermediate contact retaining groove 75, a second intermediate contact retaining groove 76, an annular convex portion 77, a pair of elastic piece portions 78, and a pair of to-be-positioned portions 69.

The outer peripheral portion 7*c* of the adapter housing 7 is formed in an approximately cylindrical shape. A predetermined area from the first end portion 7*a* of the adapter housing 7 in the fitting direction X1 forms a cylindrical fitting cylinder portion 73 arranged to be inserted and fitted into the cylindrical portion 31 of the connector 2 side. The first terminal insertion recessed portion 71 is an inside space of the fitting cylinder portion 73 and opened through the first end portion 7*a* side. The center terminal portion 40 and the outer terminal portion 50 of the connector 2 are arranged to be inserted into the first terminal insertion recessed portion 71.

A circumferentially extending annular engagement protrusion 74 is formed in a manner protruding from the outer peripheral surface of the fitting cylinder portion 83 in the first end portion 7*a*. The locking protrusion 31*c* (see FIGS. 8B, 9A, and 9B) of the connector 2 side is arranged to elastically override and engage the annular engagement protrusion 74 when fitting between the adapter 1 and the connector 2 (see FIG. 3).

The pair of second terminal insertion recessed portions 72, into which the pair of respective opposing terminals 102, 103 are arranged to be inserted, are formed within a predetermined area from the second end portion 7*b* in the direction opposite to the fitting direction X1 (see FIGS. 16A and 16B). The pair of second terminal insertion recessed portions 72 are opened through the second end portion 7*b* side.

The first intermediate contact retaining groove 75 and the second intermediate contact retaining groove 76 are formed within a predetermined area from the second end portion 7*b* side in the direction opposite to the fitting direction X1 and opened through the second end portion 7*b* side.

The first intermediate contact retaining groove 75 is located adjacent to the first terminal insertion recessed portion 71 into which the center terminal portion 40 is arranged to be inserted and to the second terminal insertion recessed portion 72 into which the one opposing terminal 102 is arranged to be inserted. The fixed portion 80 of the first intermediate contact 8 is pressed and fixed into the first intermediate contact retaining groove 75 (see FIG. 16A). The contact portion 81*c* of the first contact piece portion 81 of the first intermediate contact 8 is located to advance into the first terminal insertion recessed portion 71. The contact portion 82*c* of the second contact piece portion 82 of the first intermediate contact 8 is located to advance into the corresponding second terminal insertion recessed portion 72.

The second intermediate contact retaining groove 76 is located adjacent to the first terminal insertion recessed portion 71 into which the outer terminal portion 50 is arranged to be inserted and to the second terminal insertion recessed portion 72 into which the other opposing terminal 102 is arranged to be inserted. The fixed portion 90 of the second intermediate contact 9 is pressed and fixed into the second intermediate contact retaining groove 76 (see FIG. 16B). The contact portion 91*c* of the third contact piece portion 91 of the second intermediate contact 9 is located to advance into the first terminal insertion recessed portion 71. The contact portion 92*c* of the fourth contact piece portion 92 of the second intermediate contact 9 is located to advance into the corresponding second terminal insertion recessed portion 72.

As shown in FIGS. 10, 11, and 14C, a circumferentially extending annular convex portion 77 is formed in a manner protruding from the outer peripheral portion 7*c* within a predetermined area from the second end portion 7*b*. A pair of cantilevered elastic piece portions 78 are formed in a manner extending by a predetermined length toward the first end portion 7*a* side of the annular convex portion 77 from an end portion closer to the first end portion 7*a* side. The pair of elastic piece portions 78 have an arc-shaped cross section and are located on radially opposite sides. A clearance gap S (see FIG. 16A) is provided between the pair of elastic piece portions 78 and the outer peripheral portion 7*c*, so that the pair of elastic piece portions 78 are radially and elastically deformable.

A pair of to-be-positioned portions 79 are formed in a manner protruding from the outer surface in the vicinity of a tip end portion of the pair of elastic piece portions 78. The pair of to-be-positioned portions 79 are each formed in an angled convex portion. The pair of to-be-positioned portions 79 are located in mutually asymmetric positions with respect to the center C2 of the first terminal insertion recessed portion 71 (see FIG. 14A). As shown in FIG. 15, when the pair of to-be-positioned portions 79 engage the positioning grooves 104, 105 (positioning portions) provided in the opposing housing 101 of the opposing connector 100, the adapter 1 is positioned in the circumferential direction of the fitting cylinder portion 73 with respect to the opposing connector 100.

In accordance with this embodiment, the adapter 1 is connected to the opposing connector 100 in advance, as shown in FIG. 1A. That is, the second contact piece portion 82 of the first intermediate contact 8 and the fourth contact piece portion 92 of the second intermediate contact 9 of the adapter 1 are connected, respectively, with the corresponding opposing terminals 102, 103 (see FIGS. 16A and 16B). When fitting the connector 2 into the adapter 1 in the fitting direction X1, the first contact piece portion 81 of the first intermediate contact 8 elastically contacts the outer peripheral surface 40*b* of the protruding portion 40*a* of the center terminal portion 40 of the connector 2 and the third contact piece portion 91 of the second intermediate contact 9 elastically contacts the outer peripheral surface 50*a* of the outer terminal portion 50 of the connector 2, as shown in FIG. 3.

Since the adapter housing 7 and the connector housing 3 are displaceable rotationally relative to each other about the central axis C1 of the center terminal portion 40, the connector 2 can be fitted to the adapter 1 no matter how the connector 2 is oriented with respect to the adapter 1, as shown in FIGS. 1B and 17A to 17C. That is, the fitting workability is improved with no need to adjust the orientation of the connector 2 with respect to the adapter 1.

Also, referring to FIG. 3, when the adapter housing 7 and the connector housing 3 are displaced relatively and rotationally about the central axis C1, the contact portion 81*c* of the first contact piece portion 81 of the first intermediate contact 8 is displaced circumferentially in a sliding manner with respect to the outer peripheral surface 40*b* of the protruding portion 40*a* of the center terminal portion 40 and the contact portion 91*c* of the third contact piece portion 91 of the second intermediate contact 9 is displaced circumferentially in a sliding manner with respect to the outer peripheral surface 50*a* of the outer terminal portion 50. This makes terminal connections using the adapter 1 and the connector 2 substantially possible regardless of the orientation with respect to the opposing connector 100.

Also, when fitting between the adapter 1 and the connector 2, the locking protrusion 31*c* on the inner peripheral surface 31*b* of the cylindrical portion 31 of the connector 2 side elastically overrides and engages the annular engagement protrusion 74 on the outer peripheral surface of the fitting cylinder portion 73 of the adapter 1 side, as shown in FIG. 3, which prevents the connector 2 from coming off from the adapter 1. When the cylindrical portion 31 of the connector 2 side and the fitting cylinder portion 73 of the adapter 1 side rotate circumferentially relative to each other, the locking protrusion 31*c* and the engagement protrusion 74 also rotate circumferentially relative to each other. This allows for retention between the adapter 1 and the connector 2 regardless of the orientation with respect to the opposing connector 100. In other words, the locking structure cannot interfere with the relative rotational displacement between the adapter 1 and connector 2.

Also, as shown in FIG. 2, the insulating member 6 is centered on the central axis C1 and includes the insulating cylinder portion 60 into which the center terminal portion 40 is inserted and fitted, and which is inserted and fitted into the outer terminal portion 50. As a result, insulation can be provided between the center terminal portion 40 and the outer terminal portion 50, which are located concentrically, with such a simple structure using the insulating cylinder portion 60.

In addition, the insulating member 6 includes the insulating wall portion 61 that provides insulation between the first wire connecting portion 44 of the center terminal 4 and the second wire connecting portion 52 of the outer terminal 5, and the insulating wall portion 61 is provided in a manner extending from the insulating cylinder portion 60. As a result, insulation can be provided between the first wire connecting portion 44 and the second wire connecting portion 52 with such a practical and simple structure using the insulating wall portion 61 that is provided in a manner extending from the insulating cylinder portion 60.

Also, as shown in FIG. 4, when the center terminal 4, the outer terminal 5, and the insulating member 6 are unitized, assembling work can be performed easily.

The adapter housing 7 includes the to-be-positioned portions 79 (see FIG. 15) arranged to engage the positioning grooves 104, 105 of the opposing housing 101 so that the first intermediate contact 8 and the second intermediate contact 9 are aligned, respectively, with the corresponding opposing terminals 102, 103. As a result, when preliminarily fitting the adapter 1 to the opposing connector 100, each of the intermediate contacts 8, 9 is easily positioned with respect to the corresponding opposing terminals 102, 103.

The present invention is not limited to the above-described preferred embodiments. For example, an insulating portion interposed between the center terminal portion 40 and the outer terminal portion 50 may be formed by a part of the connector housing 3, although not shown.

Figure 18:
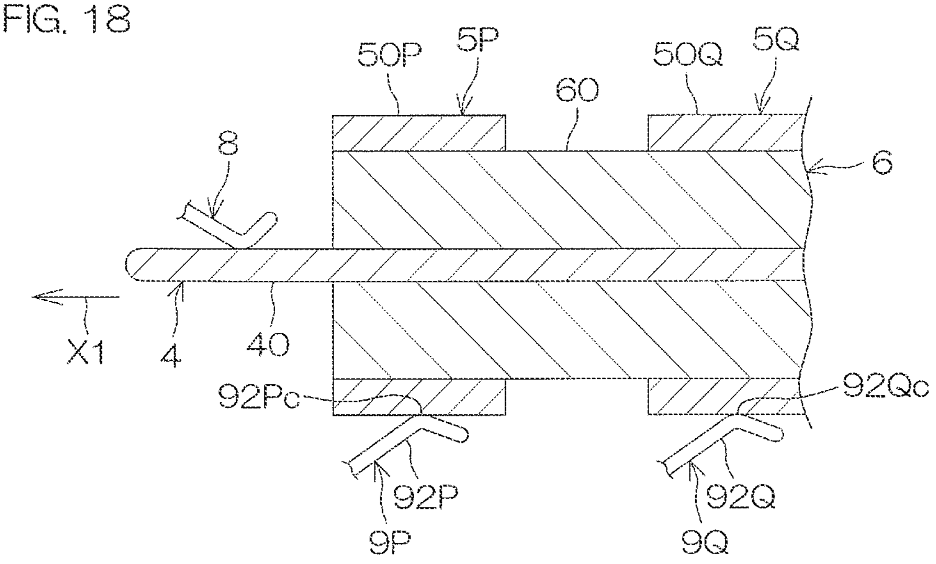
FIG. 18 is a schematic cross-sectional view of a center terminal and an outer terminal according to a modification.

Two outer terminals 5P, 50 may also be provided as in a modification shown in FIG. 18. An outer terminal portion 50P of the outer terminal 5P and an outer terminal portion 50Q of the outer terminal 50 are located apart in the axial direction (fitting direction X1) of the insulating cylinder portion 60 in a state enclosing the insulating cylinder portion 60. In the adapter 1 side, two second intermediate contacts 9P, 9Q are provided correspondingly to the two respective outer terminals 5P, 5Q.

In addition, the position of the contact portion 92Pc of the fourth contact piece portion 92P of the second intermediate contact 9P with respect to the outer terminal 5P and the position of the contact portion 92Qc of the fourth contact piece portion 92Q of the second intermediate contact 90 with respect to the outer terminal 5Q are offset with respect to each other in the fitting direction X1. In this case, three-pole terminal connection is made possible regardless of the orientation of the connector with respect to the opposing connector. It is noted that three or more outer terminals and three or more second intermediate contacts may be provided.

Although the present invention has been described in detail from the specific aspects, those skilled in the art who have understood the aforementioned content will easily recognize its modifications, variations, and equivalents. Therefore, the present invention should be within the scope of the claims and the scope of its equivalents.

REFERENCE SIGNS LIST

1: Adapter
2: Connector
3: Connector housing
4: Center terminal
5; 5P, 5Q: Outer terminal
6: Insulating member
7: Adapter housing
8: First intermediate contact
9; 9P, 9Q: Second intermediate contact
30: Main body portion
31: Cylindrical portion
31*a*: Slit
31*b*: Inner peripheral surface
31*c*: Locking protrusion
32: Cover
34: Terminal portion housing portion
35: Connecting space portion
40: Center terminal portion
40*a*: Protruding portion
40*b*: Outer peripheral surface
43: Positioning wall portion
44: First wire connecting portion
50; 50P, 50Q: Outer terminal portion
50*a*: Outer peripheral surface
51: Positioning wall portion
52: Second wire connecting portion
60: Insulating cylinder portion (insulating portion)
61: Insulating wall portion
66: Engagement protrusion
73: Fitting cylinder portion
74: Engagement protrusion
75: First intermediate contact retaining groove
76: Second intermediate contact retaining groove
78: Elastic piece portion
79: To-be-positioned portion
80: Fixed portion
81: First contact piece portion
81*c*: Contact portion
82: Second contact piece portion
82*c*: Contact portion
90: Fixed portion
91: Third contact piece portion
91*c*: Contact portion
92; 92P, 92Q: Fourth contact piece portion
92*c*; 92Pc, 92Qc: Contact portion
100: Opposing connector
101: Opposing housing
102, 103: Opposing terminal
104, 105: Positioning groove (positioning portion)
C1: Central axis
CS: Connector structure
D1, D2: Wire
X1: Fitting direction

The invention claimed is:

1. A connector structure comprising:

an adapter to be fitted to an opposing connector that includes an opposing housing and a plurality of opposing terminals supported on the opposing housing and extending in parallel with each other; and a connector to be fitted to the adapter in a fitting direction, wherein the connector includes a connector housing, a center terminal supported on the connector housing and including a pin-shaped center terminal portion with a central axis extending in the fitting direction, and an outer terminal supported on the connector housing and including a cylindrical outer terminal portion that concentrically encloses the center terminal portion with an interposed insulating portion, the center terminal portion including a protruding portion that protrudes from the outer terminal portion in the fitting direction, the adapter includes an adapter housing to be fitted to the connector housing in the fitting direction and displaceable rotationally relative to the connector housing about the central axis and a first intermediate contact and a second intermediate contact supported on the adapter housing, the first intermediate contact includes a first contact piece portion to elastically contact the outer peripheral surface of the protruding portion of the center terminal portion and a second contact piece portion to elastically contact a corresponding one of the opposing terminals, and the second intermediate contact includes a third contact piece portion to elastically contact the outer peripheral surface of the outer terminal portion and a fourth contact piece portion to elastically contact a corresponding one of the opposing terminals.

2. The connector structure according to claim 1, wherein when the adapter housing and the connector housing are displaced relatively and rotationally with respect to each other, a contact portion of the first contact piece portion is displaced circumferentially in a sliding manner with respect to the outer peripheral surface of the center terminal portion and a contact portion of the third contact piece portion is displaced circumferentially in a sliding manner with respect to the outer peripheral surface of the outer terminal portion.

3. The connector structure according to claim 1, wherein the adapter housing includes a fitting cylinder portion that has an annular engagement protrusion extending entirely circumferentially on the outer peripheral surface of the adapter housing, the connector housing includes a cylindrical portion centered on the central axis, the cylindrical portion split circumferentially with a slit that extends axially to the tip end to be radially and elastically deformable and having at least one locking protrusion on the inner peripheral surface of the cylindrical portion, and when the fitting cylinder portion is inserted and fitted into the cylindrical portion, the locking protrusion overrides and engages the engagement protrusion so that the fitting cylinder portion is prevented from coming off.

4. The connector structure according to claim 1, wherein a plurality of the outer terminals are provided in a mutually insulated manner, a plurality of the second intermediate contacts are provided correspondingly to the plurality of outer terminals, and a contact portion of each of the plurality of second intermediate contacts and a corresponding one of the outer terminals are positionally offset with respect to each other in the fitting direction.

5. The connector structure according to claim 1, wherein the insulating portion includes an insulating member including an insulating cylinder portion into which the center terminal portion is inserted and fitted, and which is inserted and fitted into the outer terminal portion, the insulation cylinder portion being centered on the central axis.

6. The connector structure according to claim 5, wherein the center terminal includes a first wire connecting portion extending from the center terminal portion and to which a corresponding wire is connected, the outer terminal includes a second wire connecting portion extending from the outer terminal portion and to which a corresponding wire is connected, and the insulating member includes an insulating wall portion extending from the insulating cylinder portion and providing insulation between the first wire connecting portion and the second wire connecting portion.

7. The connector structure according to claim 5, wherein the center terminal, the outer terminal, and the insulating member are unitized.

8. The connector structure according to claim 1, wherein the adapter housing includes a to-be-positioned portion to engage a positioning portion of the opposing housing so that the first intermediate contact and the second intermediate contact are aligned, respectively, with corresponding ones of the opposing terminals.

* * * * *